United States Patent Office 3,654,280
Patented Apr. 4, 1972

3,654,280
L-N ALLYLIC-3-HYDROXY-6-OXOMORPHINANS
Yoshiro Sawa, Ashiya-shi, Hyogo, Ryozo Maeda, Osaka-shi, Osaka, and Haruhiko Tada, Toyonaka-shi, Osaka, Japan, assignors to Shionogi & Co., Ltd., Osaka, Japan
No Drawing. Filed Mar. 17, 1969, Ser. No. 807,917
Claims priority, application Japan, Mar. 21, 1968, 43/18,385
Int. Cl. C07d 43/32
U.S. Cl. 260—285    4 Claims

ABSTRACT OF THE DISCLOSURE

An L-3-hydroxy-6-oxomorphinan compound represented by the formula:

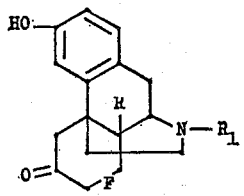

wherein R represents a hydrogen atom or a hydroxyl group, $R_1$ represents an allyl group, a $\gamma,\gamma$-dimethylallyl group or a cyclopropylmethyl group and F represents the presence or absence of a double bond, being useful as a narcotic antagonist, is prepared by introducing the substituent at the N-position.

---

The present invention relates to L-3-hydroxy-6-oxomorphinan compounds and their production. More particularly, it relates to L-3-hydroxy-6-oxomorphinan compounds useful as narcotic antagonists and their production.

The said L-3-hydroxy-6-oxomorphinan compound ("L" means herein a morphinan conformation similar to those derived from thebaine) is represented by the formula:

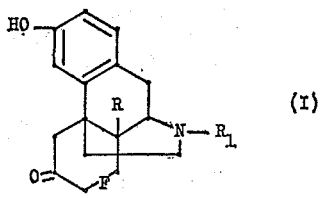

wherein R represents a hydrogen atom or a hydroxyl group, $R_1$ represents an allyl group, a $\gamma,\gamma$-dimethylallyl group or a cyclopropylmethyl group and F represents the presence or absence of a double bond.

There have heretofore been known some narcotic antagonists. For instance, levallorphan tartrate (i.e. L-3-hydroxy-N-allylmorphinan tartrate) is commercially available as a narcotic antagonist. For the purpose of developing new narcotic antagonists, the present inventors have prepared many morphinan compounds, examined their narcotic antagonisms and discovered that, of these compounds examined, the said morphinan compounds (I) have excellent narcotic antagonism in comparison with known narcotic antagonists. Thus, the present invention has been established.

Accordingly, a basic object of the present invention is to embody the L-3-hydroxy-6-oxomorphinan compound (I). Another object of this invention is to embody the L-3-hydroxy-6-oxomorphinan compound (I) useful as a narcotic antagonist. A further object of the invention is to embody a process for preparing the L-3-hydroxy-6-oxomorphinan compound (I). These and other objects will be apparent to those conversant with the art to which the present invention pertains from the subsequent description.

The said L-3-hydroxy-6-oxomorphinan compound (I) can be prepared by reacting a morphinan compound represented by the formula:

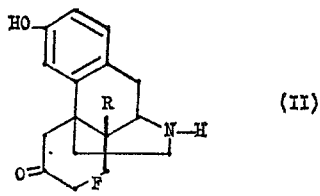

wherein R represents a hydrogen atom or a hydroxyl group and F represents the presence or absence of a double bond with a halogen compound represented by the formula:

$$R_1—X \qquad (III)$$

wherein $R_1$ represents an allyl group, a $\gamma,\gamma$-dimethylallyl group or a cyclopropylmethyl group and X represents a halogen atom in an inert solvent medium.

The starting morphinan compound (II) illustratively involves L-3-hydroxy-6-oxomorphinan, L-3-hydroxy-6-oxo - 7 - dehydromorphinan, L-3,14-dihydroxy-6-oxomorphinan and L-3,14-dihydroxy-6-oxo-7-dehydromorphinan. These starting compounds can be prepared, for instance, by reacting an N-methylmorphinan with cyanogen bromide in chloroform to give an N-cyanomorphinan and treating the said product with hydrochloric acid while heating (Sawa et al.: U.S. Pat. 3,201,403). The said starting compound may be substituted with the corresponding 3-alkoxymorphinan compound as far as the latter is subjected to a conventional ether fission before the start of the present reaction. The halogen compound (III) involves illustratively allyl halide (e.g. allyl bromide, allyl chloride, allyl iodide), $\gamma,\gamma$-dimethylallyl halide (e.g. $\gamma,\gamma$-dimethylallyl chloride, $\gamma,\gamma$-dimethylallyl bromide, $\gamma,\gamma$-dimethylallyl iodide) and cyclopropylmethyl halide (e.g. cyclopropylmethyl chloride, cyclopropylmethylbromide, cyclopropylmethyl iodide).

The preparation of the L-3-hydroxy-6-oxomorphinan compound (I) is carried out by reacting the starting compound (II) with the halogen compound (III) in the presence of an inert solvent. The reaction temperature may be adapted suitably within the scope of a temperature from ice cooling temperature to refluxing temperature of the solvent used. Examples of the solvent are alcohols (e.g. methanol, ethanol, isopropanol), aromatic hydrocarbons (e.g. benzene, toluene, xylene), ethers (e.g. ether, dioxane, tetrahydrofuran, diglyme), dimethylformamide, dimethylsulfoxide and their mixture. The reaction may be effected more favorably in the presence of a conventional basic substance under nitrogen stream. As the basic substance, there are exemplified organic bases (e.g. pyridine, pycoline, dimethylaniline, triethylamine) and inorganic bases (e.g. sodium bicarbonate, potassium bicarbonate, sodium carbonate, potassium carbonate, sodium hydroxide, potassium hydroxide, lithium hydroxide, ammonium hydroxide, barium hydrodide). The solvent may be substituted for an excessive amount of the organic base. The objective substance of this invention may be isolated and purified in a conventional manner such as extraction, distillation, recrystallization, column chromatography or thin layer chromatography.

The thus obtained L-3-hydroxy-6-oxomorphinan compound (I) involves illustratively L-3-hydroxy-6-oxo-N-allylmorphinan,
L-3-hydroxy-6-oxo-N-(γ,γ-dimethylallyl)morphinan,
L-3,14-dihydroxy-6-oxo-N-allylmorphinan,
L-3-hydroxy-6-oxo-N-cyclopropylmethylmorphinan,
L-3,14 - dihydroxy-6-oxo-N-cyclopropylmethylmorphinan,
L-3-hydroxy-6-oxo-7-dehydro-N-allylmorphinan, and
L-3-hydroxy-6-oxo-7-dehydro-N-(γ,γ-dimethylallyl)morphinan.

The L-3-hydroxy-6-oxomorphinan compound (I) forms acid addition salts with organic and inorganic acids. Illustrative acid addition salts include the acetate, succinate, oxalate, tartrate, salicylate, benzoate, malate, citrate, hydrochloride, nitrate, sulfate, hydrobromide, hydroiodide and phosphate.

The objective L-3-hydroxy-6-oxomorphinan compounds (I) and their acid addition salts exhibit remarkable narcotic antagonism. In comparison with a commercially available narcotic antagonist, levallorphan tartrate (i.e. L-3-hydroxy-N-allylmorphinan tartrate), the narcotic antagonism and acute toxicity in mice are shown in the following table:

TABLE

| Compound | Narcotic[1] antagonism (ED$_{50}$, mg./kg.) | Acute toxicity[2] (LD$_{50}$, mg./kg.) |
| --- | --- | --- |
| Levallorphan tartrate | 0.23 | 200 |
| L-3, 14-dihydroxy-6-oxo-N-cyclopropylmethylmorphinan·H$_2$O | 0.045 | >800 |
| L-3-hydroxy-6-oxo-N-allymorphinan·HCl·½H$_2$O | 0.043 | 370 |
| L-3, 14-dihydroxy-6-oxo-N-allymorphinan·HCl·2H$_2$O | 0.039 | 250 |

[1] Narcotic antagonism was examined as follows: As test animals, there were used dds-strain albino male mice weighing 17 to 21 grams. This test was effected substantially according to a modified method of the Haffner-Hesse's method [Hesse: Arch. exp. Path. u. Pharm., vol. 158, p. 233 (1930)]. Test animals were first treated with 10 mg./kg. of morphine (showing 100% of the effective dose) substantially and 5 minutes later, test compounds intraperitoneally. Thirty minutes after the adminstration of the morphine, the tail of test mice was pinched by a forceps for pressure impetus. The narcotic antagonism was measured by confirming any response of the screams and bitings as an effective indication. These percent effects were plotted against logarithmic dose on probability graphic paper and the effective dose (ED$_{50}$) was determined by the method of Litchfield and Wilcoxon.

[2] Acute toxicity was examined as follows: Test compounds were applied subcutaneously to dds-strain albino mice in different single doses. For each dose 10 mice were used, their weight ranging from 17 to 21 grams. The animals were observed for 72 hours after the administration of the test compound. The LD$_{50}$ was calculated by graphic interpolation from two doses actually used, one of which killed less than half and the other more than half the number of mice treated (Schleicher and Schull probability graphic paper 298½ was used for the graphic interpolation).

Other L-3-hydroxy-6-oxomorphinan compounds (I) show similar narcotic antagonisms. Accordingly, the L-3-hydroxy-6-oxomorphinan compounds (I) and their acid addition salts are useful as narcotic antagonists. In addition to these narcotic antagonisms, they are also useful as less or non-narcotic analgesic, sedative and antitussive agents.

The said L-3-hydroxy-6-oxomorphinan compounds (I) may be administered alone or in combination with medically acceptable carriers, the choice of which is determined by the preferred route of administration, the solubility of the substance and standard pharmaceutical practice. In general, the dosage of these substances is of approximately one tenth to equal order of magnitude as dosage of levallorphan tartrate, and the compounds of this invention is useful to treat patients suffering from painful conditions and side reactions ascribing to narcotic analgesic agents such as morphine. Examples of their pharmaceutical preparations are tablets, capsules, pills, suspension, solution, emulsion and suppositories. In the preparation of tablets, for example, these substances may be combined with binders such as gum tragacanth, acacia, corn starch, gelatin, etc. It is also usually desirable to add a disintegrating agent such as corn starch, potato starch, alginic acid or the like. Also usually desirable as a lubricant such as stearic acid, magnesium sterate or talc along with a sweetening agent such as saccharin. In the preparation of capsules, fillers as enumerated above for tablets can also be used. The composition when used in the form of suspension or solution may be combined with aqueous sugar or sorbitol type vehicle including a viscosity control agent such as magnesium aluminum silicate, methocel or carboxymethylcellulose and a suitable preservative.

Enteral compositions containing the compounds of this invention may be dispensed in dosage unit forms for a single daily therapeutic dose or in smaller units for multiple doses or in larger units for division into single doses. Parenteral compositions can also be dispensed with single units or in larger quantities from which each single dose is to be withdrawn at the time of use.

Presently-preferred and practical embodiments of the present invention are illustratively shown in the following examples.

EXAMPLE 1

To a hot solution of L-3-hydroxy-6-oxo-7-dehydromorphinan (derived from thebaine) (1.056 g.) in dimethylformamide (30 ml.), there are added sodium bicarbonate (0.347 g.) and a solution of γ,γ-dimethylallyl bromide (0.616 g.) in dimethylformamide (10 ml.), and the resultant mixture is stirred at 110° C. under nitrogen stream for 2 hours. After cooling, water (200 ml.) and a small amount of ammonium chloride are added thereto and the resultant mixture is shaken with chloroform. The chloroform layer is shaken with 1 N hydrochloric acid (100 ml.). The hydrochloric acid layer is made alkaline with ammonium hydroxide and shaken with chloroform. The chloroform layer is dried over anhydrous potassium carbonate and the chloroform is evaporated. The residue is chromatographed on alumina (8 g.) eluting with chloroform (200 ml.) to give crude product (0.596 g.). The product is recrystallized from ethyl acetate to give L-3-hydroxy - 6 - oxo - 7 - dehydro - N - (γ,γ-dimethylallyl) morphinan (0.505 g.) as crystals melting at 195 to 196° C. (decomp.).

$[\alpha]_D^{24}$ −139.1±7.3° (c.=0.152, CHCl$_3$)

EXAMPLE 2

To a suspension of L-3-hydroxy-6-oxomorphinan (derived from thebaine) (0.700 g.) in dimethylformamide (20 ml.), there is added sodium bicarbonate (0.2285 g.), and a solution of γ,γ-dimethylallyl bromide (0.402 g.) in dimethylformamide (10 ml.) is added dropwise with stirring while heating (bath temperature: 110° C.) under nitrogen stream. The reaction is continued for 2 hours. After cooling, water (100 ml.) and a small amount of ammonium chloride are added and the resultant mixture is shaken with chloroform containing 4% methanol. The chloroform layer is shaken with 1 N hydrochloric acid (90 ml). The hydrochloric acid layer is purified with a small amount of active carbon, made alkaline with ammonia and shaken with chloroform. The chloroform solution is dried over anhydrous potassium carbonate and the solvent is evaporated. The residue is chromatographed on alumina (5 g.) eluting with benzene containing 10% chloroform to give a crude product (0.700 g.). The crude product is recrystallized from ethanol to give L-3-hydroxy-6 - oxo - N - (γ,γ-dimethylallyl)morphinan (0.615 g.) as crystals melting at 204 to 205° C.

$[\alpha]_D^{24}$ −150.0±3.4° (c.=0.562, CHCl$_3$)

EXAMPLE 3

To a suspension of L-3-hydroxy-6-oxomorphinan (derived from thebaine) (0.4 g.) in dimethylformamide (15 ml.), there is added sodium bicarbonate (0.131 g.). Under nitrogen stream with stirring, allyl bromide (0.188 g.) is added dropwise thereto and the resultant mixture is heated at a bath temperature of 110 to 120° C. for 1.5 hours. After cooling, the reaction mixture is mixed with water (30 ml.) and shaken with chloroform containing 5% methanol. The chloroform extract is dissolved in 1 N hydrochloric acid (30 ml.) and washed with chloroform. The hydrochloric acid layer is purified with a small amount of active carbon, made alkaline with sodium bicarbonate and shaken with chloroform. The extract (0.450 g.) is dissolved in acetone (10 ml.) and salicylic acid (0.23 g.) is added to the solution to give a salicylate (0.513 g.) as crystals melting at 215 to 216° C. (decomp.). The salicylate is dissolved in water, made alkaline with potassium carbonate and shaken with chloroform to give a product (0.348 g.). The product is recrystallized from methanol to give L-3-hydroxy-6-oxo-N-allylmorphinan (0.293 g.) as crystals melting at 197 to 198° C. (decomp.). The hydrochloride of this substance forms crystals melting at 236 to 237° C. (decomp.).

$[\alpha]_D^{24}$ −92.1±3.0° (c.=0.433, $H_2O$)

EXAMPLE 4

To a hot solution of L-3-hydroxy-6-oxo-7-dehydromorphinan (derived from thebaine) (0.927 g.) in dimethylformamide (30 ml.), there is added sodium bicarbonate (0.305 g.), and a solution of allyl bromide (0.438 g.) in dimethylformamide (10 ml.) is added dropwise thereto. The resultant mixture is heated at 120° C. for 1.5 hours. After cooling, the reaction mixture is added to water (320 ml.) and a small amount of ammonium chloride is added thereto. The resultant mixture is shaken with chloroform containing 4% ethanol, and the chloroform layer is shaken with 1 N hydrochloric acid (50 ml.). The hydrochloric acid layer is purified with a small amount of active carbon, made alkaline wtih ammonium hydroxide and shaken with chloroform. The chloroform layer is dried over anhydrous sodium sulfate and the chloroform is evaporated. The residue (0.9 g.) is chromatographed on alumina (4 g.) eluting with chloroform. The eluate is recrystallized from tetrahydrofuran to give L-3-hydroxy-6-oxo-7-dehydro-N-allylmorphinan (0.578 g.) as crystals melting at 202 to 203° C. (decomp.).

$[\alpha]_D^{23}$ −140.1±1.7° (c.=1.011, EtOH)

The hydrochloride of this substance melts at 190 to 191° C. (decomp.).

EXAMPLE 5

A mixture of L-3-methoxy-6-oxo-14-hydroxymorphinan (derived from thebaine) (0.5 g.) and 48% hydrobromic acid (5 ml.) is refluxed for 15 minutes. The reaction mixture is concentrated under reduced pressure to evaporate the hydrobromic acid. The residue is dried in vacuum in a desiccator and dissolved in dimethylformamide (30 ml.). To this solution, sodium bicarbonate (0.154 g.) is added and, with stirring, there is added dropwise a solution of allyl bromide (0.210 g.) in dimethylformamide (5 ml.). The resultant mixture is heated at 110 to 120° C. (bath temperature) for 1.5 hours. After cooling, the reaction mixture is mixed with water (250 ml.), salted out with ammonium chloride and shaken with dichloromethane. The dichloromethane layer is dried over anhydrous sodium sulfate and the dichloromethane is evaporated. The residue is crystallized from ethanol to give a crude product (0.425 g.). The product is recrystallized from 95% ethanol to give L-3,14-dihydroxy-6-oxo-N-allylmorphinan (0.394 g.) as crystals melting at 229 to 230° C. (decomp.).

$[\alpha]_D^{23}$ −135.0±1.8° (c.=0.989, EtOH)

The hydrochloride of this substance melts at 274 to 275° C. (decomp.).

EXAMPLE 6

To a mixture of L-3-hydroxy-6-oxomorphinan (derived from thebaine) (0.235 g.), sodium bicarbonate (0.085 g.) and dimethylformamide (5 ml.), there is added a solution of cyclopropylmethyl chloride (0.091 g.) in dimethylformamide (5 ml.) with stirring. The resultant mixture is heated at a bath temperature of 110 to 120° C. on an oil bath. Twenty hours and 48 hours later, sodium bicarbonate (0.015 g.) and cyclopropylmethyl chloride (0.016 g.) are added respectively and heating is continued for 64 hours as a whole. After cooling, the reaction mixture is mixed with water (20 ml.) and shaken with chloroform. The chloroform layer is dried over anhydrous potassium carbonate to give a crude product (0.333 g.). The product is dissolved in 1 N sodium hydroxide aqueous solution (10 ml.), washed with benzene (20 ml.), made alkaline with ammonium chloride and shaken with chloroform. The chloroform layer is dried over anhydrous potassium carbonate and the chloroform is evaporated. The resulting crude product (0.269 g.) is recrystallized from acetone to give L-3-hydroxy-6-oxo-N-cyclopropylmethylmorphinan monohydrate (0.208 g.) as crystals melting at 127 to 128° C. The salicylate of this substance melts at 226 to 227° C. (decomp.).

EXAMPLE 7

A mixture of L-3-methoxy-6-oxo-14-hydroxy-morphinan (derived from thebaine) (1.1 g.) and 48% hydrobromic acid (11 ml.) is heated at 150 to 160° C. on an oil bath for 15 minutes and the excessive hydrobromic acid is evaporated. To the obtained L-3,14-dihydroxy-6-oxomorphinan hydrobromide, there are added dimethylformamide (70 ml.) and sodium bicarbonate (0.380 g.) to neutralize the mixture. A solution of sodium bicarbonate (0.354 g.) and cyclopropylmethyl chloride (0.410 g.) in dimethylformamide (10 ml.) is added thereto and the resultant mixture is heated at a bath temperature of 110 to 115° C. on an oil bath. Twenty-two hours later, sodium bicarbonate (0.129 g.) and cyclopropylmethyl chloride (0.139 g.) are added thereto and heating is continued for 68 hours as a whole. After cooling, the reaction mixture is combined with water (100 ml.) and shaken with chloroform. The chloroform layer is dried over anhydrous potassium carbonate and the chloroform is evaporated. The residue (1.403 g.) is chromatographed on alumina (14 g.) eluting with chloroform to give L-3,14-dihydroxy-6-oxo-N-cyclopropylmethylmorphinan monohydrate (0.828 g.). The substance is recrystallized from ethanol to give crystals melting at 181 to 182° C.

What is claimed is:

1. A member selected from the group consisting of a compound of the formula

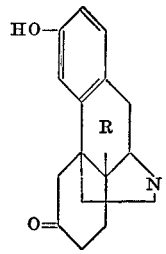

wherein R is hydrogen or hydroxyl and $R_1$ is allyl or γ,γ-dimethylallyl and medically acceptable acid addition salts thereof.

2. The compound according to claim 1 wherein R is hydrogen and $R_1$ is allyl.

3. The compound according to claim 1 wherein R is hydroxyl and $R_1$ is allyl.

4. The compound according to claim 1 wherein R is hydrogen and $R_1$ is γ,γ-dimethylallyl.

References Cited

UNITED STATES PATENTS

| 2,524,856 | 10/1950 | Schnider et al. | 260—285 X |
| 2,885,401 | 5/1959 | Grussner et al. | 260—285 |
| 3,201,403 | 8/1965 | Sawa et al. | 260—285 |
| 3,254,088 | 5/1966 | Lewenstein | 260—285 |
| 3,299,072 | 1/1967 | Bartels-Keith | 260—285 |
| 3,318,884 | 5/1967 | Brown et al. | 260—285 X |
| 3,394,139 | 7/1968 | Sawa et al. | 260—285 |
| 3,493,657 | 2/1970 | Lewenstein et al. | 260—285 |

FOREIGN PATENTS

| 40/17021 | 8/1965 | Japan | 260—285 |
| 44/4114 | 2/1969 | Japan | 260—285 |
| 1,502,604 | 10/1967 | France | 260—285 |

DONALD G. DAUS, Primary Examiner

U.S. Cl. X.R.

424—260

UNITED STATES PATENT OFFICE
CERTIFICATE OF CORRECTION

Patent No. 3,654,280          Dated   April 4, 1972

Inventor(s)   Yoshiro Sawa et al.

It is certified that error appears in the above-identified patent and that said Letters Patent are hereby corrected as shown below:

Claim 1, line 3, correct the formula to read:

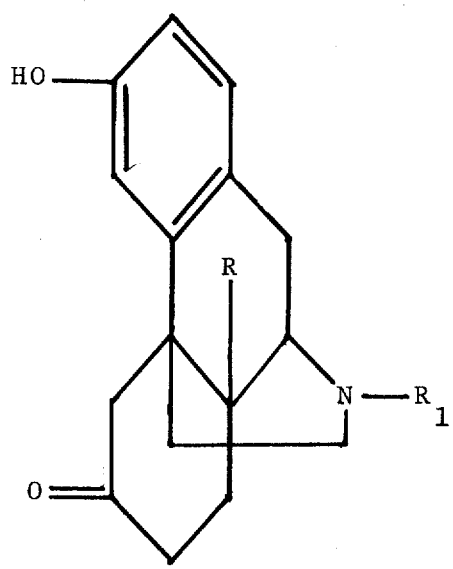

Signed and sealed this 7th day of November 1972.

(SEAL)
Attest:

EDWARD M. FLETCHER, JR.                    ROBERT GOTTSCHALK
Attesting Officer                          Commissioner of Patents